Sept. 27, 1955     H. C. ZIMMERMAN     2,718,912
COVER FOR THE ROOF AND WINDOW PORTIONS OF A VEHICLE
Filed May 3, 1954
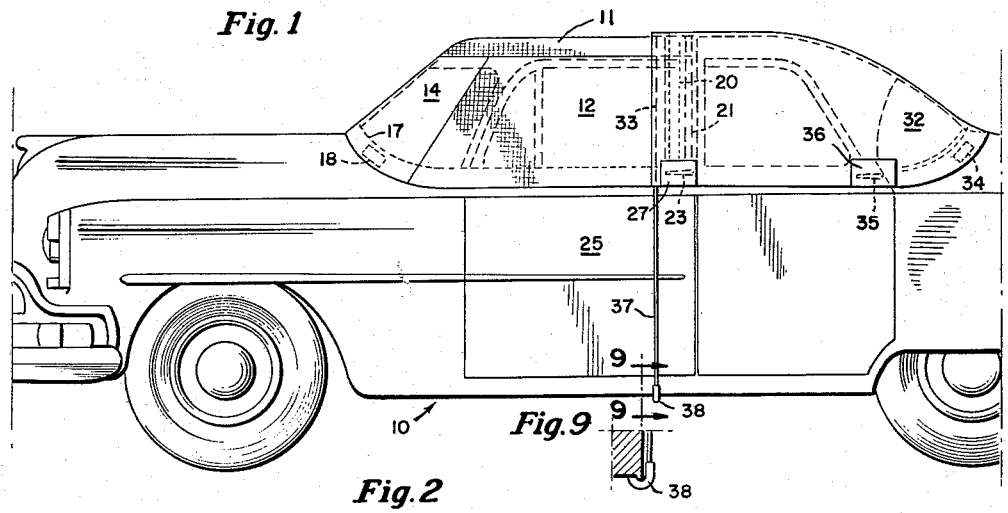
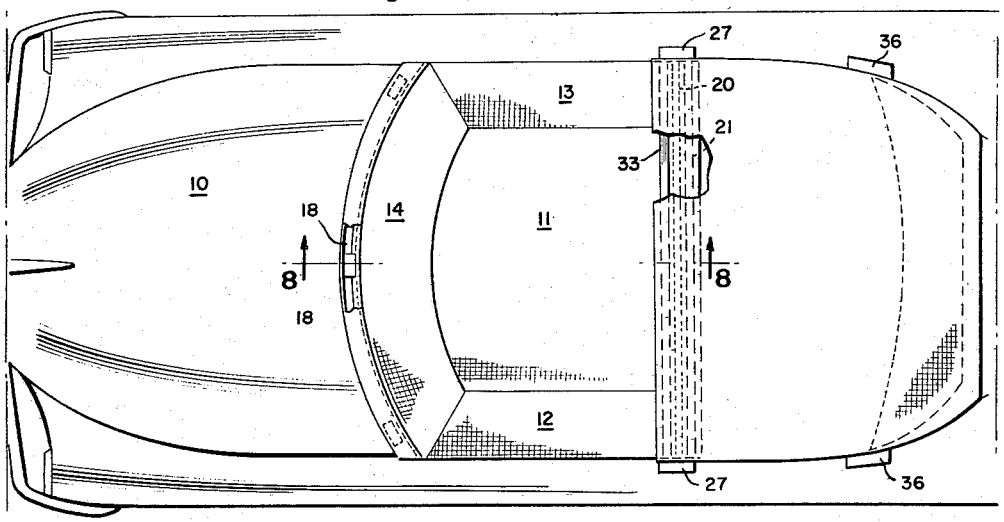
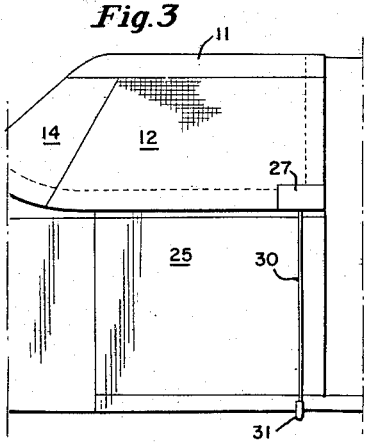
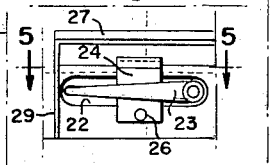
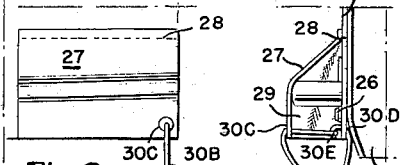
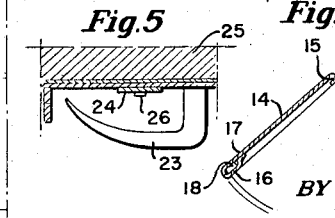
INVENTOR
Helen C. Zimmerman
BY
ATTORNEY

United States Patent Office 2,718,912
Patented Sept. 27, 1955

2,718,912

COVER FOR THE ROOF AND WINDOW PORTIONS OF A VEHICLE

Helen Catharine Zimmerman, Baltimore, Md.

Application May 3, 1954, Serial No. 427,000

7 Claims. (Cl. 150—52)

The present invention relates to a protector for covering windows and lock mechanisms particularly of automobiles against sleet, frost or other matter carried in the air.

Heretofore, motorists have been annoyed by the accumulation of frost and ice upon the windshield and windows of a motor vehicle and especially when the vehicles are parked outdoors. Some motorists have attempted to solve the problem by the use of newspaper or other sheet material to cover the windshield but such improvisations have many disadvantages requiring almost as much effort to remove the frozen newspapers as to remove the ice or frost. Various types of covers have been suggested but none has acquired common use because the problem was not satisfactorily solved.

An object of the present invention is to provide a windshield and window protector for automobiles which can be readily applied and removed, stored in a limited space and remain effective for all conditions of weather.

Another object of the invention is to provide a protector which extends over the roof and window portion of the vehicle to effectively maintain the windshield and side windows of the vehicle in a usable condition regardless of meteorological conditions.

Another object is to provide protecting hoods for the roof and window portion including the rear window of vehicles in which one size of the protecting hoods will be effective on a large number of different makes and sizes of vehicles.

Other and further objects will be apparent as the description proceeds and upon reference to the drawing wherein:

Fig. 1 is a side elevation of an automobile with the roof, windshield and window protector and the rear window protector in operative positions;

Fig. 2, a top plan of the roof, windshield, window, and rear window protectors in operative position on a vehicle;

Fig. 3, an elevation with parts broken away of the front roof, windshield and window protector in place on a vehicle and showing a different means of securing the protector to the vehicle;

Fig. 4, an elevation on an enlarged scale of a portion of a protector showing the door handle flap raised and showing one means of securing the protector to the door handle of a vehicle;

Fig. 5, a section taken on line 5—5 of Fig. 4 showing the cooperative relation of the door handle and the securing strap;

Fig. 6, a detailed elevation on an enlarged scale of the flap for covering the door handle and door lock with two means for securing the protector in position;

Fig. 7, a rear end view of the structure of Fig. 6 of a portion of the cover, showing the flap held in its operative position by a strand;

Fig. 8, a section taken on line 8—8 of Fig. 2 of a portion of the protectors showing the overlap;

Fig. 9, a detail on an enlarged scale of a hook for retaining the protector in position taken on line 9—9 of Fig. 1.

Briefly, the present invention includes a covering for the roof and window portion of a vehicle and comprises a roof panel, side panels connected to the edges of the roof panel, a front panel for overlying the windshield connected to the forward edges of the side panels and the forward edge of the roof panel. The cover is held in place by suitable means which may include openings in the lower rear corners of the side panels, which openings receive the conventional door handle and a strap is provided for preventing unintentional removal of the cover, while flaps are provided to overlap the openings and protect the door handles and locks. Suitable weights are provided in the lower portion of the front panel for preventing wind from blowing the front panel out of position and a supplemental fastening means in the form of a preferably resilient strand secured to the hood and provided with a hook at its outer end which is adapted to be positioned so that the hook engages a lower edge of the vehicle body or frame. Another protecting cover may be provided over the rear window and may be secured to the door handle or by means of a strand element having a hook at its outer edge.

Referring more particularly to the drawing, an automobile 10 is illustrated as having a protecting hood thereon. Such hood includes a roof panel 11 side panels 12 and 13 attached to the side edges of the roof panel and a front panel 14 attached to the front edge of the roof panel, said front and side panels being secured together by stitching 15 or the like, the front edges of the side panels being secured to the side edges of the front panel by similar stitching forming a relatively flat seam.

The lower edges of the front and side panels are hemmed by under-folding the material 16 of the marginal portion and stitching such under-folded material by a row of stitching 17 or the like, forming a tubular hem margin in which a plurality of weights 18 which may be of lead or the like are positioned for preventing the margin of the hood from being blown out of protective position.

The rear edge of the protecting hood has a marginal portion 19 folded under and secured by stitching 20 to form a tubular margin in which a resilient elastic member 21 of rubber or the like is mounted, the ends of such elastic strip being secured to the lower rear edge portions of the side panels and being under appreciable stress when the hood is in use and applied to the roof portion of a vehicle. For securing the hood in position, an opening 22 is provided in the lower rear marginal portion of each side panel for receiving the conventional door handle 23 and a strap 24 is secured to the side panel above the opening for extending through the space between the door handle 23 and the automobile door 25, the strap 24 being provided with a releasable fastener element 26 for securing the strap to the lower marginal portion of the side panel thereby preventing accidental removal of the hood from the vehicle.

A flap 27 is secured to each side panel by stitching 28 or the like along the upper edge and a gusset member 29 extends from the side panel to the front edge of the flap and is of a size to prevent the flap from being retained in a non-protecting position, such gusset member being secured to the associated side member and the flap by suitable means or such gusset member may be integral with the flap.

It will be apparent that the protecting hood may be applied to the vehicle by merely positioning such hood over part of the roof and window portion of the vehicle and passing the material of the rear lower marginal portions of the hood over the adjacent door handle 23 so that the opening 22 embraces the door handle and the strap 24 is then passed between the door handle 23 and the door 25 and such strap is secured by fastening element 26. When the hood is applied over both door handles, the elastic element 21 is stressed so that the hood snugly engages the roof and window portions of the automobile body and the weights 18 maintain the front portion in windshield protecting position. The protective hood may be readily removed by merely reversing the process. The hood may be made of any suitable flexible material such as water repellent and/or rubberized fabric, plastics, or other suitable material and such protective hood may be stored in a minimum of space.

In Fig. 3 a similar hood is shown to include the roof panel, side panels and front panel, and an additional fastening element in the form of a strand 30 is secured to the lower rear marginal portion of each side member and such strand material is provided with a hook 31 at its outer end, such hook being covered with a tubular protector such as rubber tubing to prevent marring of the finish. The hook 31 and the strand 30 may be used in addition to the door handle fastening arrangement or may be used instead of such door handle fastening arrangement for securing or additionally securing the protective hood in position. If desired, other flexible members may be provided at other locations for a similar purpose.

An additional securing means for the roof and window protecting hood and flap may include a strand 30A which may be of resilient material having a loop 30B formed at one end thereof and such strand extends through an eyelet 30C in the flap 27 and an eyelet 30D in the side panel. A knot or other suitable projection 30E may be provided in the loop portion 30B between the flap 27 and side panel 12 and a suitable hook may be provided at the end of the strand 30A such as that shown at 31 in Fig. 3. The strand material 30A thereby serves to maintain the protecting hood in position and to maintain the door handle lock and protecting flap in position. The knot 30E serves to prevent excessive force on the flap portion 27.

An additional protector for the rear window of a vehicle includes a panel 32 of a shape to snugly engage such window and/or the adjacent portion of the vehicle. Such panel may be hemmed in a similar manner to that of the roof and window protecting hood and may include an elastic strap 33 along the forward edge and suitable weights 34 may be provided along the lower edge. The panel may be retained on the rear door handles 35 by structure similar to that for the front protecting hood and a flap 36 may be provided for protecting the door handle and the door lock, if any, to prevent the accumulation of ice or other foreign material. An additional fastening means may include a flexible strand 37 and a hook 38 which hook may be covered with a suitable protecting material such as rubber tubing or the like and such hook may engage over a projecting lip of the vehicle body and thereby retain the panel 32 in operative position, the resilient strip 33 maintaining an intimate contact so that the front edge portion of the protector may serve as a trough to guide water outward off the vehicle. The rear protecting panel 32 may be held solely by the resilient flexible strand 37 and the structure for securing the panel to the door handle 35 may be completely omitted. For similar panels, the door handle 35 may be the sole means for securing the rear protecting panel in position.

Upon reference to Figs. 1, 2 and 8, it will be noted that the rear protector 32 has its front edge overlying the rear edge portion of the front protector and the amount of overlap may vary, and in extremely long automobiles, the protectors may merely abut or may even be spaced from one another.

The resilient strip 33 of the rear protector serves to cause snug engagement of the front edge portion of the rear protector against the upper surface of the rear portion of the front protector and the flexible strands 37 which may also be resilient serve to maintain the protectors in fixed position. The entire structure may be retained in place by the flexible strands 37 and the resilient strip 33 since the frictional contact between edge portions of the front and rear protectors will be maintained in position thereby, the weights serving to prevent the forwardmost and rearmost ends of the protectors from blowing out of position.

Although the entire protecting device is shown to cover the entire roof and window portion of the vehicle, it will be apparent that only a portion of the vehicle's roof and windows, such as the windshield and/or the rear window may be protected, thereby reducing the overall size of the protectors, and either protector can be used without the other, if desired.

From the above description the use of the protecting hood and window protecting panel is believed to be obvious and such protectors will be adaptable for vehicles of many different sizes and makes with a minimum of alteration so that the supplier may maintain a minimum inventory and have the proper sizes for fitting various makes and styles of automobiles and trucks.

It will be obvious to those skilled in the art that various changes may be made in the invention without departing from the spirit and scope thereof and therefore the invention is not limited by that which is shown in the drawings nor by that which is described in the specification but only as indicated in the appended claims wherein:

What is claimed is:

1. A protector for the roof and windows of a vehicle comprising a panel engageable with and of a size to cover a portion of the roof of a vehicle, side panels connected to the roof panel and extending below the windows and door handles and locks, a front panel extending from the roof panel and over the windshield and connected to the side panels thereby forming a four-sided cover, an opening in the lower rear portion of each side panel for reception of the adjacent door handle of the vehicle, a strap secured to each side panel adjacent the upper edge of the opening and of a length to cross the opening for positioning between the vehicle door and the door handle, a releasable fastener for securing the free end of the strap to its side panel, and a protecting flap secured to the rear bottom portion of each side panel overlying the door handle and lock mechanism, and means for retaining said flap in effective position for positively preventing ice from forming on the door handle, said side and front panels preventing formation of ice and frost on the front side windows and windshield of the vehicle.

2. The invention according to claim 1 and a protector for the rear window including a single panel for covering the rear window and means for retaining the rear window protector in effective position.

3. The invention according to claim 2 in which the lower edges of the protectors are provided with weights and tensile members are attached to the protectors and hooks are provided on the tensile members for securing to a portion of an automobile.

4. The invention according to claim 1 in which a resilient band extends along the rear edge of the side and roof panels for intimately maintaining the rear edge portions of the panels in contact with the adjacent portion of the roof and sides of the vehicle thereby preventing water or ice from passing onto that portion of the vehicle, the side openings in the side panels maintaining the resilient band under stress.

5. A protector for the roof and window portion of a vehicle comprising a roof panel of a size to cover at least a part of the roof of a vehicle, a front panel secured to the forward edge of the roof panel, side panels secured to the side edges of the roof panel and to the edges of the front panel providing a four-sided hood, said side panels being provided with openings at their lower rear portions for receiving the adjacent door handle, resilient means along the rear portion of the roof and side panels and secured to the marginal portion of the side panels for providing a tensile strain between the lower rear portions of the side panels which engage the door handles for retaining the protecting hood in position, and weights in the lower marginal portion of the front panel for preventing the hood from being displaced.

6. A protecting structure for the roof and window portions of a vehicle comprising a front protector having a panel for engaging and covering the windshield, front portion of the roof, and front side windows of a vehicle, an entirely separate and unconnected rear protector shaped to snugly fit the rear roof and window portion of a vehicle and being of a size sufficient to overlap and overlie the rear edge portion of the front protector, means connected to the front bottom portions of the rear protector for maintaining the front of the rear protector in intimate overlying position on the rear edge portion of the front protector and maintaining the front and rear protectors in fixed position on the vehicle whereby said means connected to the front bottom portion of the rear protector may serve to maintain the protecting structure in place.

7. The invention according to claim 6 in which the rear edge of the front protector and the front edge of the rear protector are provided with elastic strips to cause the said rear edge of the front protector to snugly engage the roof portion of the vehicle and to cause the front edge portion of the rear protector to snugly engage the rear edge of the front protector thereby sealing said edges against entrance of foreign materials.

References Cited in the file of this patent

UNITED STATES PATENTS

| | | |
|---|---|---|
| 1,559,458 | Rizianu | Oct. 27, 1925 |
| 1,999,171 | Bryant | Apr. 30, 1935 |
| 2,212,326 | Piken | Aug. 20, 1940 |
| 2,243,981 | Rowan | June 3, 1941 |
| 2,279,812 | Bartlett | Apr. 14, 1942 |
| 2,487,596 | Sackstein | Nov. 8, 1949 |
| 2,570,533 | Elliott | Oct. 9, 1951 |